(12) United States Patent
Kasher et al.

(10) Patent No.: US 10,742,273 B2
(45) Date of Patent: Aug. 11, 2020

(54) LINK MARGIN PROCEDURE FOR ENHANCED DIRECTIONAL MULTIGIGABIT (EDMG)

(71) Applicant: QUALCOMM Incorporated, San Diego, CA (US)

(72) Inventors: Assaf Yaakov Kasher, Haifa (IL); Alecsander Petru Eitan, Haifa (IL); Solomon Trainin, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/403,258

(22) Filed: May 3, 2019

(65) Prior Publication Data

US 2019/0341973 A1 Nov. 7, 2019

Related U.S. Application Data

(60) Provisional application No. 62/667,611, filed on May 6, 2018.

(51) Int. Cl.
| | | |
|---|---|---|
| *H04B 7/0417* | (2017.01) | |
| *H04B 17/336* | (2015.01) | |
| *H04B 7/06* | (2006.01) | |
| *H04L 1/00* | (2006.01) | |
| *H04B 7/02* | (2018.01) | |

(52) U.S. Cl.
CPC ........... *H04B 7/0417* (2013.01); *H04B 7/028* (2013.01); *H04B 7/0632* (2013.01); *H04B 17/336* (2015.01); *H04L 1/0003* (2013.01); *H04L 1/0009* (2013.01)

(58) Field of Classification Search
CPC .. H04B 7/0452; H04B 7/0417; H04B 7/0617; H04B 17/336; H04B 7/0695; H04B 17/318; H04B 7/061; H04B 7/088; H04B 17/309; H04B 7/028; H04B 7/0632; H04L 1/0003; H04L 1/0009; H04L 1/0026; H04L 1/0001
See application file for complete search history.

(56) References Cited

U.S. PATENT DOCUMENTS

| | | | |
|---|---|---|---|
| 7,302,009 B2 | 11/2007 | Walton et al. | |
| 2003/0087673 A1* | 5/2003 | Walton ................. | H04B 7/0452 455/562.1 |
| 2011/0261899 A1 | 10/2011 | Walton, Jr. et al. | |

(Continued)

FOREIGN PATENT DOCUMENTS

WO WO-05060192 A1 6/2005

OTHER PUBLICATIONS

Chen C., et al., "Resolution to CID 3245 and 3652", IEEE Draft;11-18-1539-05-00AY-Resolution-To-CID-3245-And-3652, IEEE-SA Mentor, Piscataway, NJ USA, vol. 802.11ay, No. 5 Sep. 13, 2018, XP068128845, Retrieved from the Internet: URL: https://mentor.ieee.org/802.11/dcn/18/11-18-1539-05-00ay-resolution-to-cid-3245-and-3652.docx [retrieved on Sep. 13, 2018], pp. 1-6.

(Continued)

*Primary Examiner* — Khanh C Tran
(74) *Attorney, Agent, or Firm* — Patterson + Sheridan, LLP

(57) ABSTRACT

Certain aspects of the present disclosure generally relate to wireless communications and, more particularly, systems and methods for a link margin procedure that accommodates reporting link parameters, such as link margin, for multiple streams.

26 Claims, 10 Drawing Sheets

(56) References Cited

U.S. PATENT DOCUMENTS

| | | | | |
|---|---|---|---|---|
| 2012/0051246 | A1* | 3/2012 | Zhang | H04L 1/0001 |
| | | | | 370/252 |
| 2018/0007712 | A1* | 1/2018 | Lou | H04B 7/0452 |
| 2018/0192356 | A1* | 7/2018 | Trainin | H04W 48/16 |
| 2019/0305996 | A1* | 10/2019 | Handte | H04L 5/0044 |

OTHER PUBLICATIONS

International Search Report and Written Opinion—PCT/US2019/030881—ISA/EPO—dated Aug. 13, 2019.

* cited by examiner

LINK MARGIN PROCEDURE FOR ENHANCED DIRECTIONAL MULTIGIGABIT (EDMG)

CLAIM OF PRIORITY UNDER 35 U.S.C. § 119

The present application for patent claims benefit of U.S. Provisional Patent Application Ser. No. 62/667,611, filed May 6, 2018, assigned to the assignee hereof and hereby expressly incorporated by reference herein.

FIELD

Certain aspects of the present disclosure generally relate to wireless communications and, more particularly, systems and methods for a link margin procedure that accommodates reporting link parameters, such as link margin, for multiple streams.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard, denotes a set of Wireless Local Area Network (WLAN) air interface standards developed by the IEEE 802.11 committee for short-range communications (e.g., tens of meters to a few hundred meters).

Amendments 802.11ad, 802.11ay, and 802.11az to the WLAN standard define the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a first interface configured to obtain one or more data frames from a wireless node via at least first and second spatial streams, a processing system configured to measure a link margin for each of the first and second spatial streams based on the one or more data frames and generate a link measurement report frame including the measured link margin for each of the first and second spatial streams, and a second interface configured to output the link measurement report frame for transmission to the wireless node.

Certain aspects of the present disclosure provide an apparatus for wireless communications. The apparatus generally includes a first interface configured to output one or more data frames to a wireless node via at least first and second data streams, a second interface configured to obtain, from the wireless node, a link measurement report frame with link parameters, including at least link margin, measured by the wireless node for each of the first and second spatial streams based on the one or more data frames, and a processing system configured to adjust, based on the link parameters in the link measurement report frame, one or more transmit parameters used for subsequent frames to be output for transmission to the wireless node.

Aspects of the present disclosure also provide various methods, means, and computer program products corresponding to the apparatuses and operations described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4 and 4A illustrate an example link margin procedure and an example link margin element, respectively.

DETAILED DESCRIPTION

Figure 1:
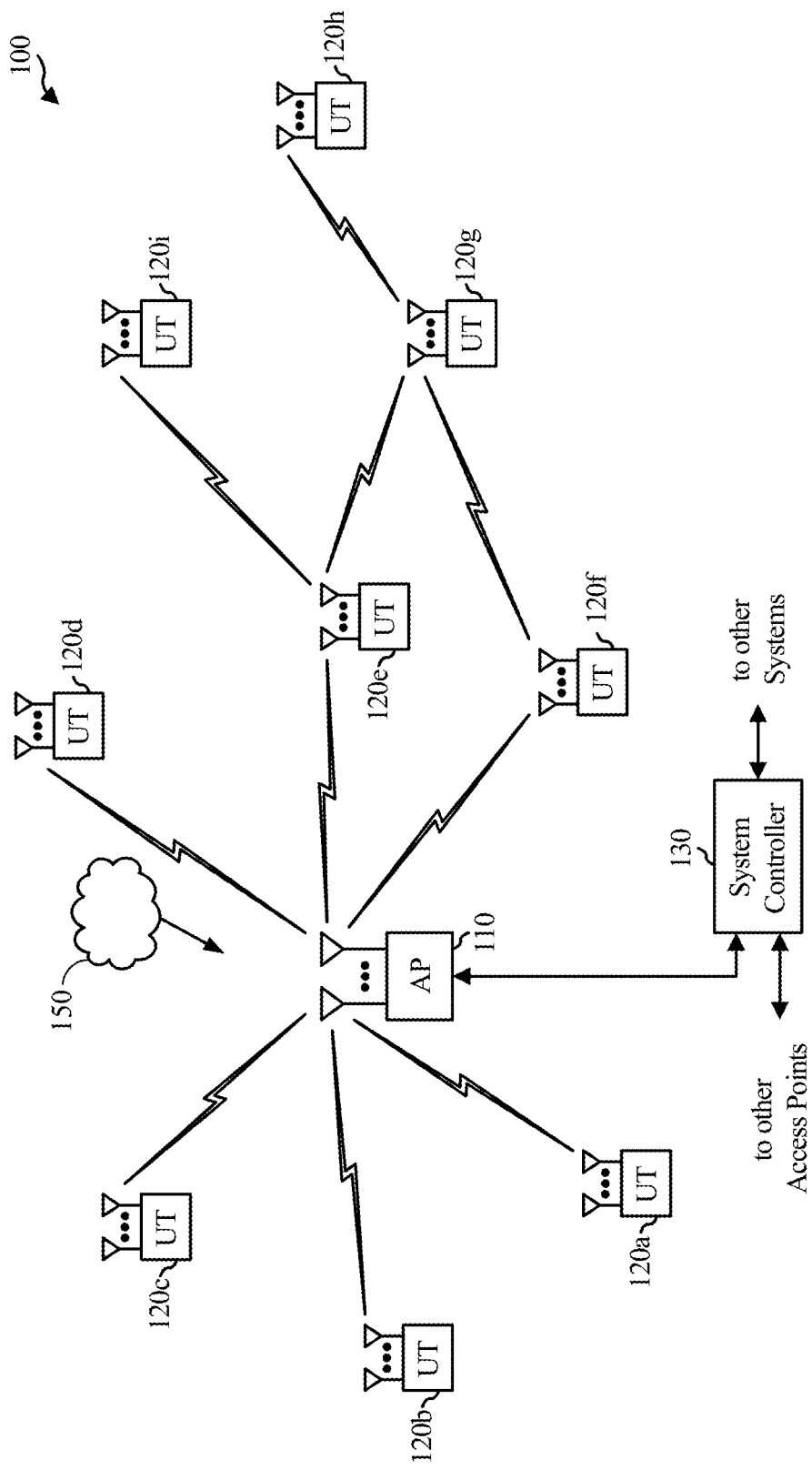
FIG. 1 is a diagram of an example wireless communications network, in accordance with certain aspects of the present disclosure.

Certain aspects of the present disclosure provide methods and apparatus for a link margin procedure by allowing the reporting of link margin parameters (e.g., link margin, SNR, and recommended MCS) for multiple streams. The techniques presented herein may be performed as part of a link adaptation procedure that aims to find an optimal modulation and coding scheme (MCS) for transmission.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates an example multiple-access multiple-input multiple-output (MIMO) system 100, in which aspects of the present disclosure may be practiced. For example, packets may be exchanged between access points 110 and user terminals 120 with link adaptation performed using techniques presented herein. The link adaptation techniques presented herein may be performed in an effort to efficiently find an optimal modulation and coding scheme (MCS) for transmission, for example, without relying on measuring the packet error rate over a large number of packets.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
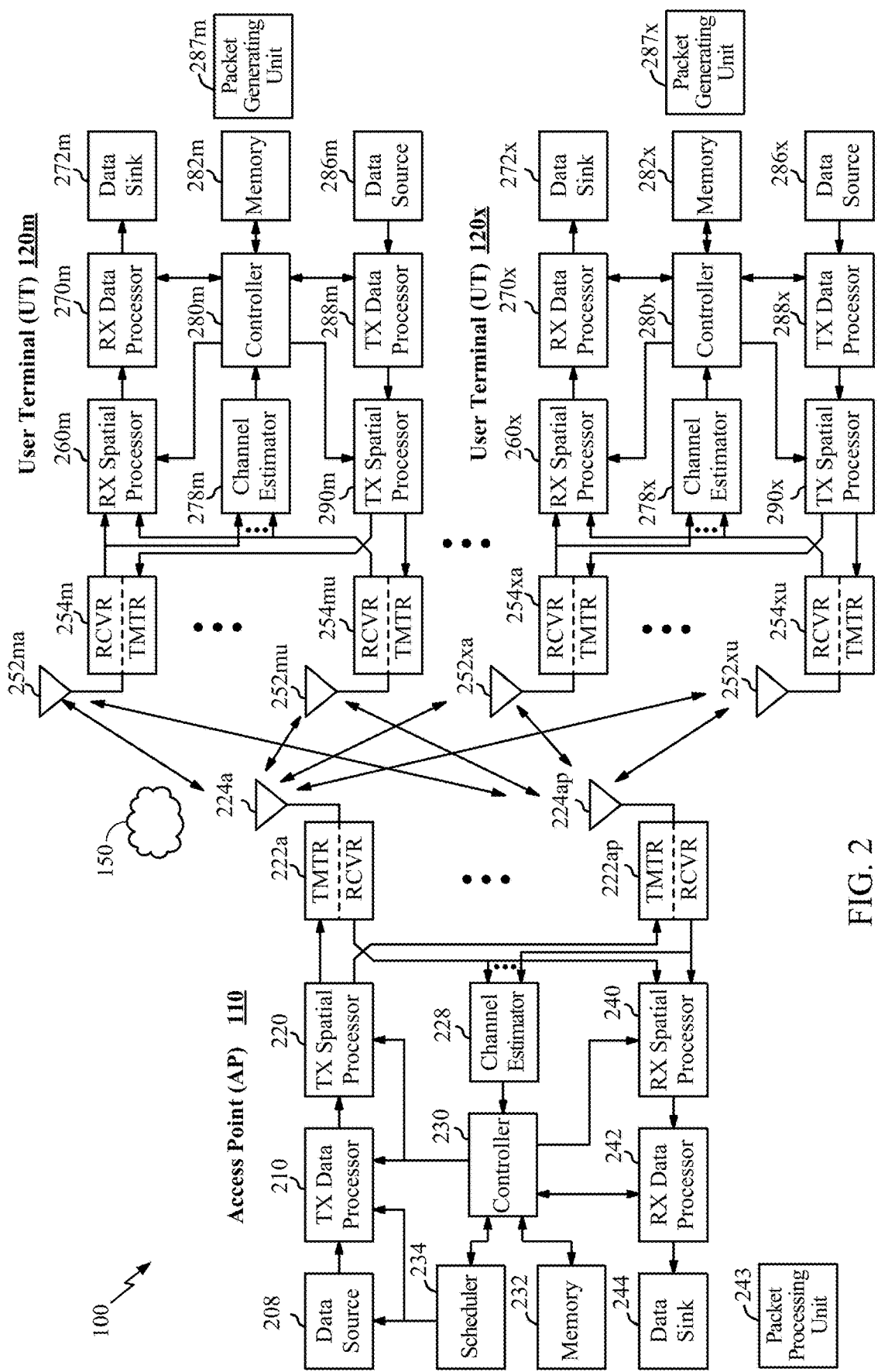
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ n antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150 to the access point 110 as part of a UL MU-MIMO transmission, for example. Each packet 150 may be transmitted on a set of one or more spatial streams (e.g., up to 4).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies).

Certain standards, such as the IEEE 802.11ay standard, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
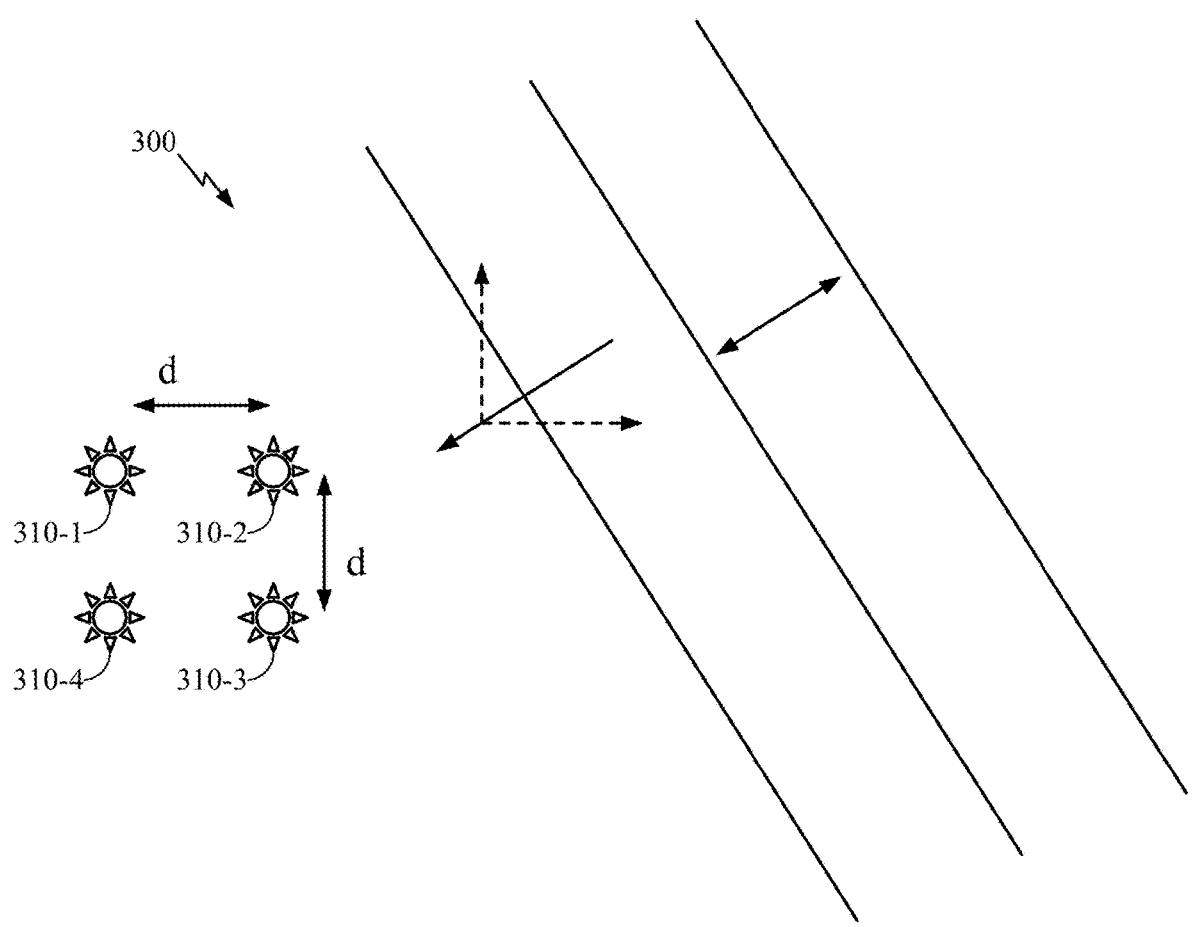
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad, 802.11ay, and 802.11az), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication. As will be described in greater detail below, in some cases, a one-dimensional sector may be formed using beamforming.

Example Link Margin Procedure

To react to changes in physical channel conditions, stations may perform a link adaptation algorithm. Link adaptation generally refers to changing link parameters, such as the modulation scheme, modulation and coding scheme (MCS), and/or transmission power, in order to achieve better network performance.

To perform link adaptation, a report of link parameters, such as link margin, signal to noise ratio (SNR), and a recommended MCS value is typically sent by one of the stations using the link. Link margin generally refers to the difference between the sensitivity of a receiver (the received power at which the receiver will stop working) and an expected minimum received power.

Figure 4:
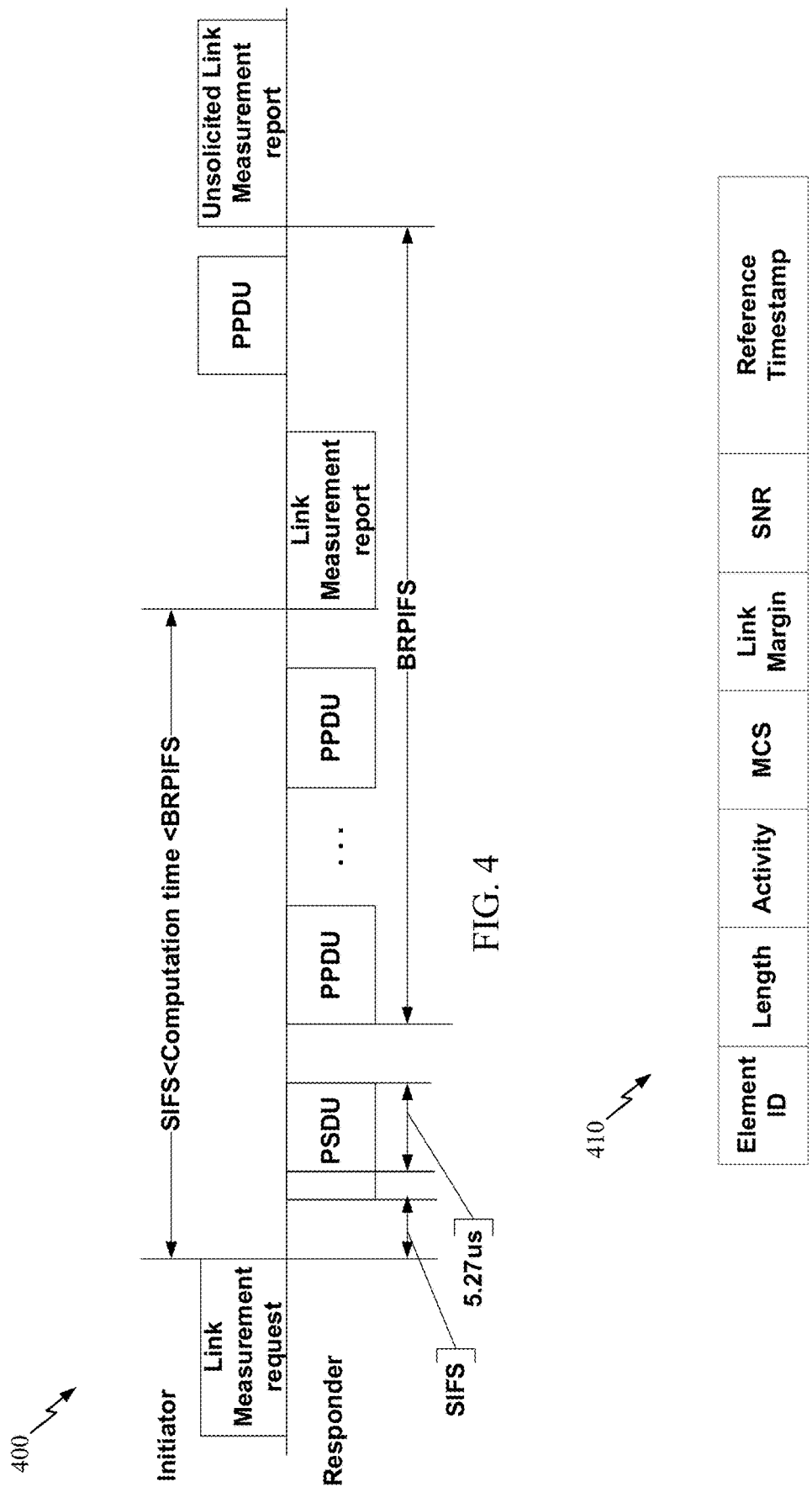

FIG. 4 illustrates a timeline 400 for an example link margin procedure. As illustrated, a STA (referred to as the "Initiator") may initiate the procedure by sending a link measurement request. Another STA (referred to as the "Responder") may respond with a link measurement report with various link parameters measured by the responder. As illustrated, the initiator (or any STA) may also send an unsolicited link measurement report.

FIG. 4A illustrates an example structure of a link margin element 410 for reporting link parameters. As illustrated, the link margin element 410 has fields for parameters such as MCS, link margin, and SNR. The link parameters may be computed using the measurements, at a receiver, of a PPDU that is the subsequent frame following the Link Measurement Request frame or based on any of the received frames from the requesting STA (including Link Measurement Request and Report frames).

The MCS field may be set to an MCS value that the STA sending the link margin element 410 recommends that the other STA use to transmit frames to this STA. The techniques by which the sending STA determines a suitable MCS for the peer STA may vary and may be implementation specific.

The Link Margin field contains the measured link margin of data frames received from the peer STA (e.g., the initiator or other station if the report is unsolicited) and is typically a value in units of decibels. A value of −128 may be used to indicate that no link margin is provided. The techniques by which link margin is measured may vary and may be implementation specific. A STA receiving a report with the link margin element 410 may choose to use values of the MCS, of the SNR and/or of the Link Margin to transmit frames to the peer STA.

The link margin procedure described herein may be used for finding the optimal MCS for transmission without relying on measuring the packet error rate over a large number of packets. When various enhancements, such as channel bonding and MIMO, are used to achieve high data rates, link adaptation may be even more important due to the large number of different MCS combinations. Unfortunately, conventional link margin procedures and reporting elements are lacking for MIMO purposes, as they typically do not support reporting for multiple streams in a single reporting element.

Certain aspects of the present disclosure, however, provide methods and apparatus for a link margin procedure for MIMO by allowing the reporting of link margin parameters (e.g., link margin, SNR, and recommended MCS) for multiple streams. As a result, the mechanisms provided herein may help achieve fast and efficient MIMO and MU-MIMO MCS selection.

Figure 5:
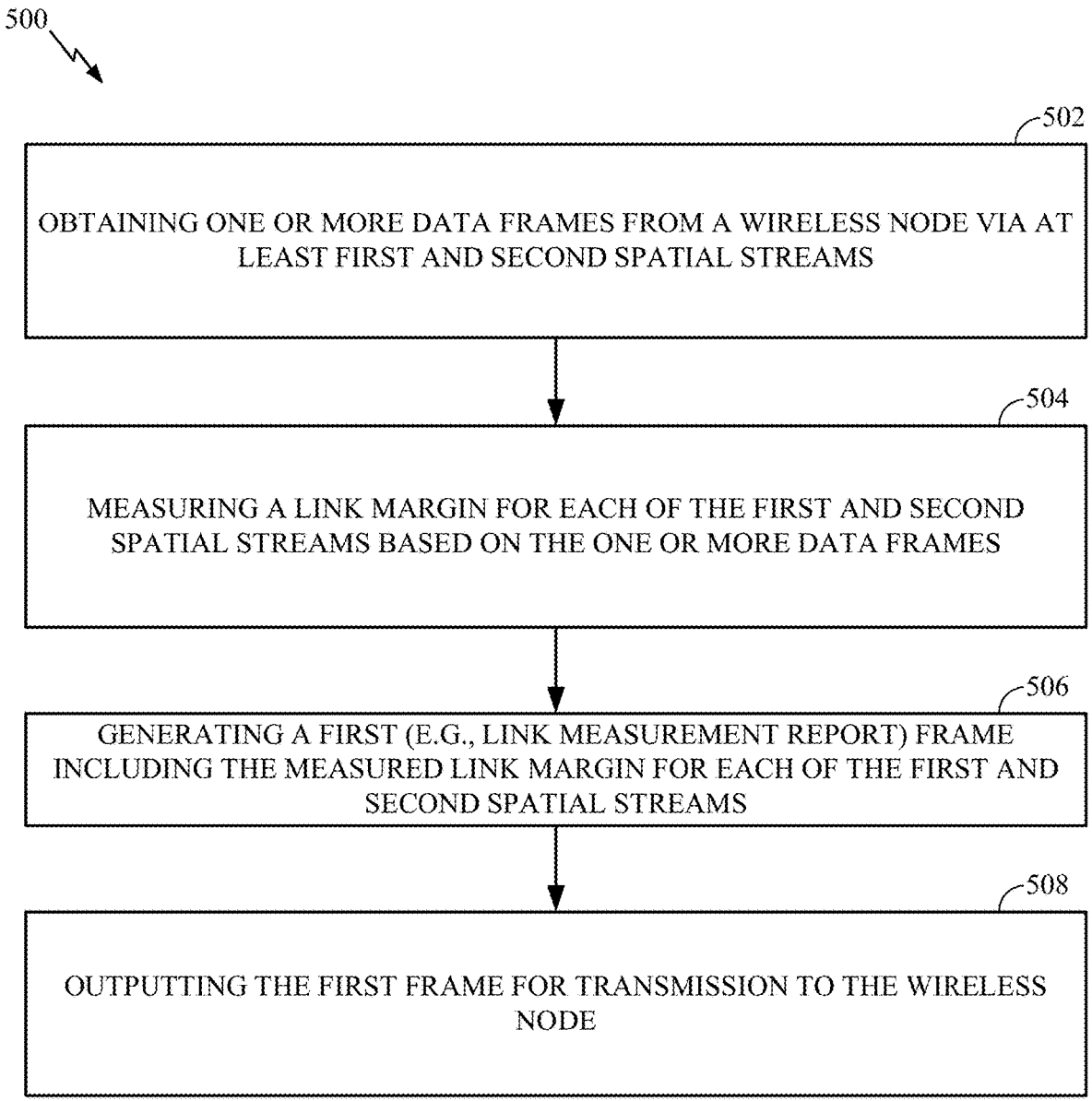
FIG. 5 illustrates example operations for link margin reporting, in accordance with certain aspects of the present disclosure.

FIG. 5 illustrates example operations 500 for MIMO link margin reporting, in accordance with certain aspects of the present disclosure.

The operations 500 (and/or operations 600 of FIG. 6) may be performed, for example, by an AP (e.g, AP 110) or a STA (e.g., user terminal 120) to assist in a link adaptation procedure. Operations 600 may be implemented as software components that are executed and run on one or more processors (e.g., controller 230 of FIG. 2). In certain aspects, the transmission and/or reception of signals by the AP may be implemented via a bus interface of one or more processors (e.g., controller 230) that obtains and/or outputs signals. Further, the transmission and reception of signals by the AP of operations 600 may be enabled, for example, by one or more antennas and/or transmitter/receiver unit(s) (e.g., antenna(s) 224 or transmitter/receiver unit(s) 222 of FIG. 2).

The operations 500 begin, at 502, by obtaining one or more data frames from a wireless node via at least first and second spatial streams. At 504, the STA measures a link margin for each of the first and second spatial streams based on the one or more data frames and, at 506, generates a link measurement report frame including the measured link margin for each of the first and second spatial streams. At 508, the STA outputs the link measurement report frame for transmission to the wireless node.

Figure 6:
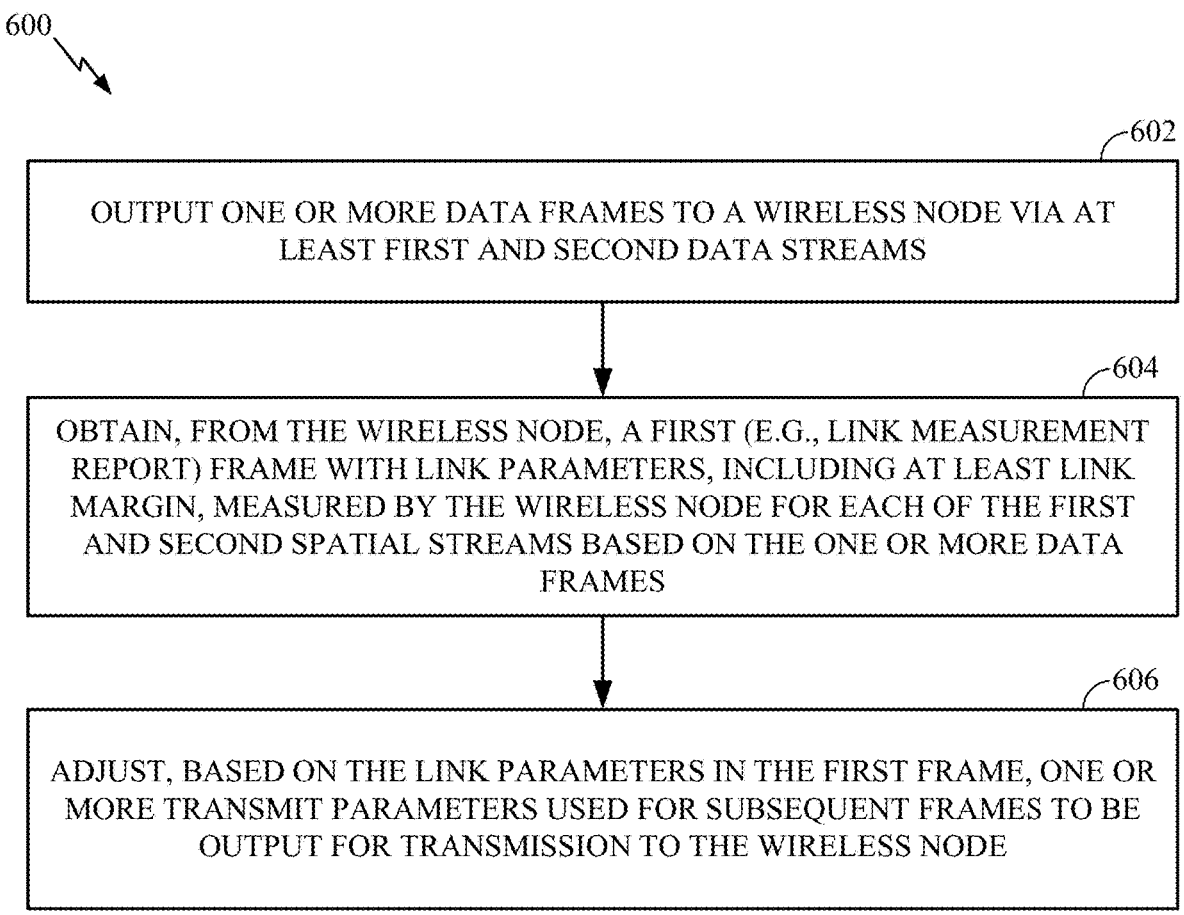
FIG. 6 illustrates example operations for obtaining a link margin report, in accordance with certain aspects of the present disclosure.

FIG. 6 illustrates example operations 600 for obtaining and processing a MIMO link margin report, in accordance with certain aspects of the present disclosure. Operations 600 may be considered complementary to operations 500 and may be performed, for example, by an initiator STA that initiated/requested a link margin report generated and reported by a STA performing operations 500.

The operations 600 begin, at 602, by outputting one or more data frames to a wireless node via at least first and second data streams. At 604, the STA obtains, from the wireless node, a link measurement report frame with link parameters, including at least link margin, measured by the wireless node for each of the first and second spatial streams based on the one or more data frames. At 606, the STA adjusts, based on the link parameters in the link measurement report frame, one or more transmit parameters used for subsequent frames to be output for transmission to the wireless node.

Various formats may be used for a link measurement report frame with "per stream" link parameters in accordance with the present disclosure. The exact format used, as well as the exact content of the link parameters included therein, may depend on the particular implementation.

Figure 7:
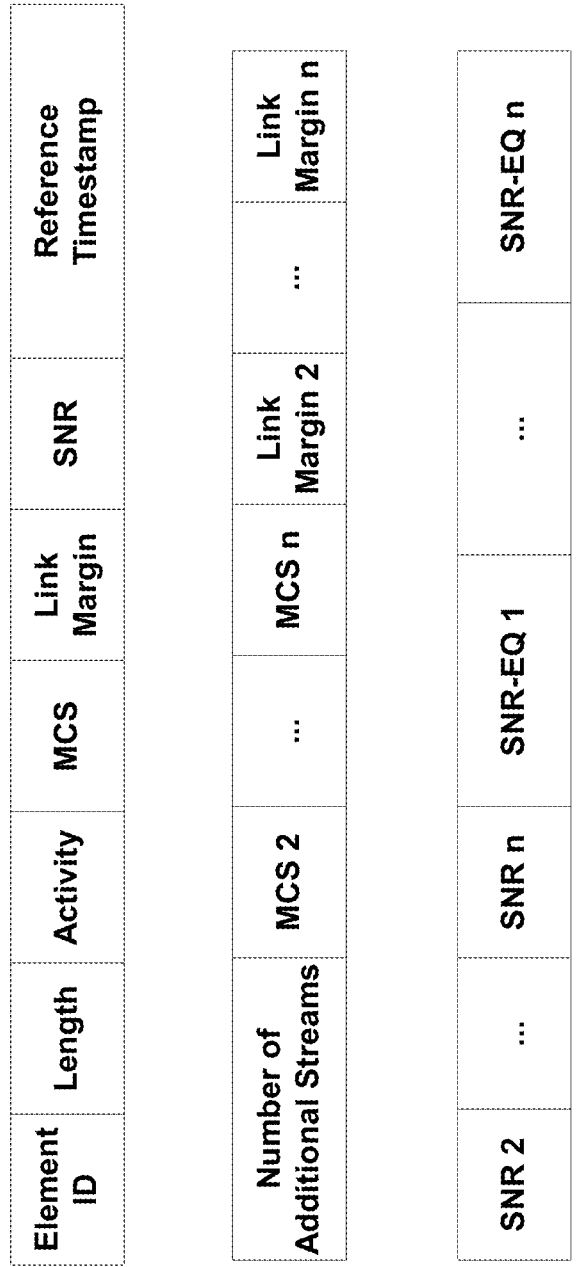
FIG. 7 illustrates an example link margin element, in accordance with certain aspects of the present disclosure.

FIG. 7 illustrates an example format 700 for reporting link margin for multiple streams, in accordance with aspects of the present disclosure. The format 700 shown in FIG. 7 may be used for MIMO and MU-MIMO transmissions, such as enhanced directional multi-gigabit (EDMG) transmissions.

As illustrated, the format 700 may include some fields similar to the directional multi-gigabit (DMG) format shown in FIG. 4A, but the format 700 is extended to include additional link parameter fields for multiple streams. As shown the example format 700 has an MCS, link margin, and SNR is provided (for n total streams).

As illustrated in FIG. 7, the format 700 may also include an SNR-EQ field for reporting an estimation of an SNR after equalization (e.g., as decoded symbols are known and may be compared to actual received results). The format 700 may also include an indication that may be used to determine how many streams are being reported. For example, the format may include a field that indicates the Number of additional Spatial streams (the number of spatial streams in addition to the first one for the total of n streams) reported using this link measurement frame. In the example format 700, the MCS, Link Margins and SNRs (after the first/normal format reported similar to the current format) are for the 2 and higher spatial streams. Different formats may include the same or similar parameters, but in a different arrangement.

Figure 8:
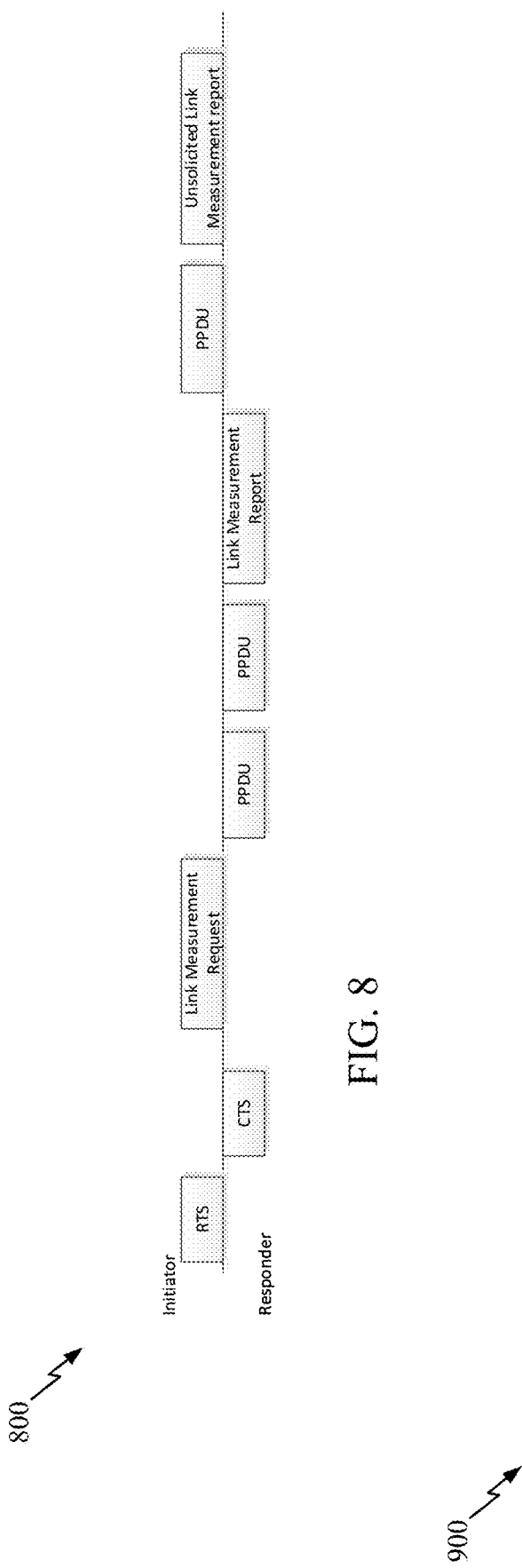
FIG. 8 illustrates an example MIMO link margin procedure, in accordance with certain aspects of the present disclosure.

FIG. 8 illustrates an example timeline 800 for a link margin procedure for MIMO, in accordance with aspects of the present disclosure (that may use the format 700 shown in FIG. 7). The particular frames shown in FIG. 8 are for illustrative purposes and other types of frames may be used for similar purposes. For example, the RTS and CTS (or other types of control frames) may be added in order to select the specific MIMO combination (AWV setting at the initiator and responder) to be used. The information may appear in the control trailer appended to these packets.

Figure 9:
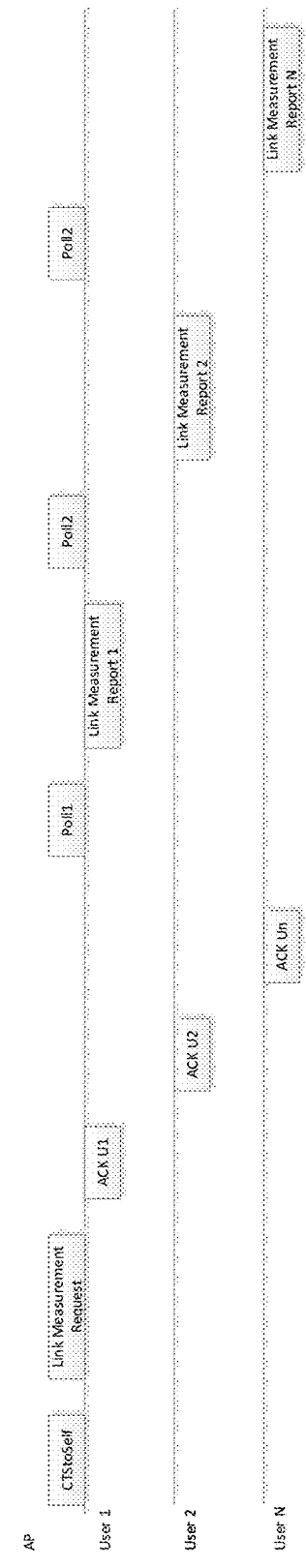
FIG. 9 illustrates an example MU-MIMO link margin procedure, in accordance with certain aspects of the present disclosure.

FIG. 9 illustrates an example timeline 900 for a link margin procedure for MU-MIMO, in accordance with aspects of the present disclosure (that may use the format shown in FIG. 7).

The AP (or other initiating STA) may start the procedure with a CTS to Self (or other type of control frame) that includes in the control trailer the EDMG group ID and MU-MIMO transmission configuration index. An EDMG group may include a group of wireless devices that support EDMG beamforming and each device in the group may have an order in which they are addressed in the group. In the illustrated example, the EDMG group may include N users (User 1 . . . User N).

The AP then sends a link measurement request to all users, for example, using the MU-MIMO antenna setting indicated in the MU-MIMO transmission configuration index. Each user (User 1 . . . User N) may respond with an ACK frame according to an order of that user in the EDMG group. The initiator then polls each user for its own link measurement report. As illustrated, each responding STA then replies with its own report, in response to the poll message (again, as determined by its order in the EDMG group).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 5A:
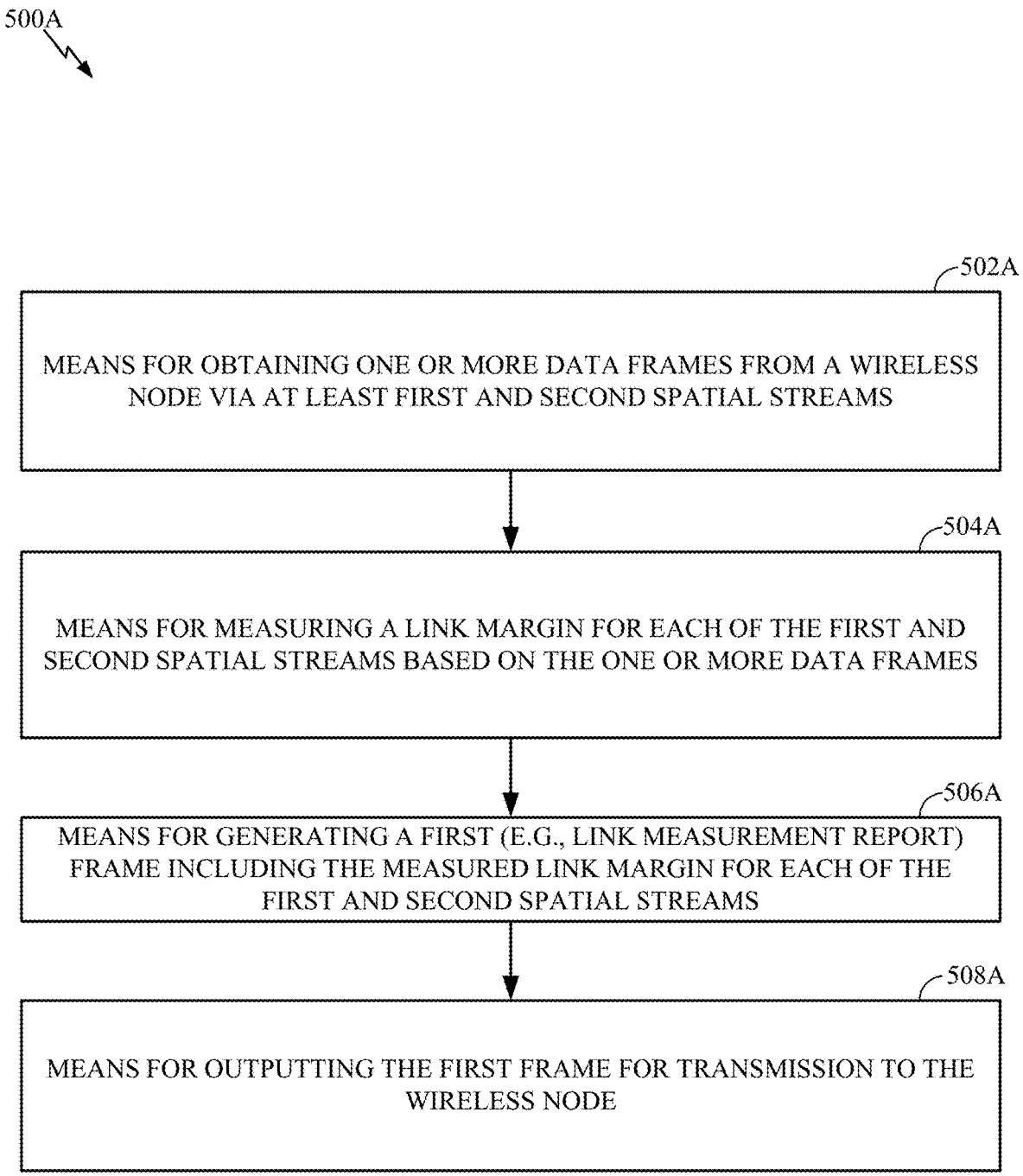
FIG. 5A illustrates example components capable of performing the operations shown in FIG. 5, in accordance with certain aspects of the present disclosure.
Figure 6A:
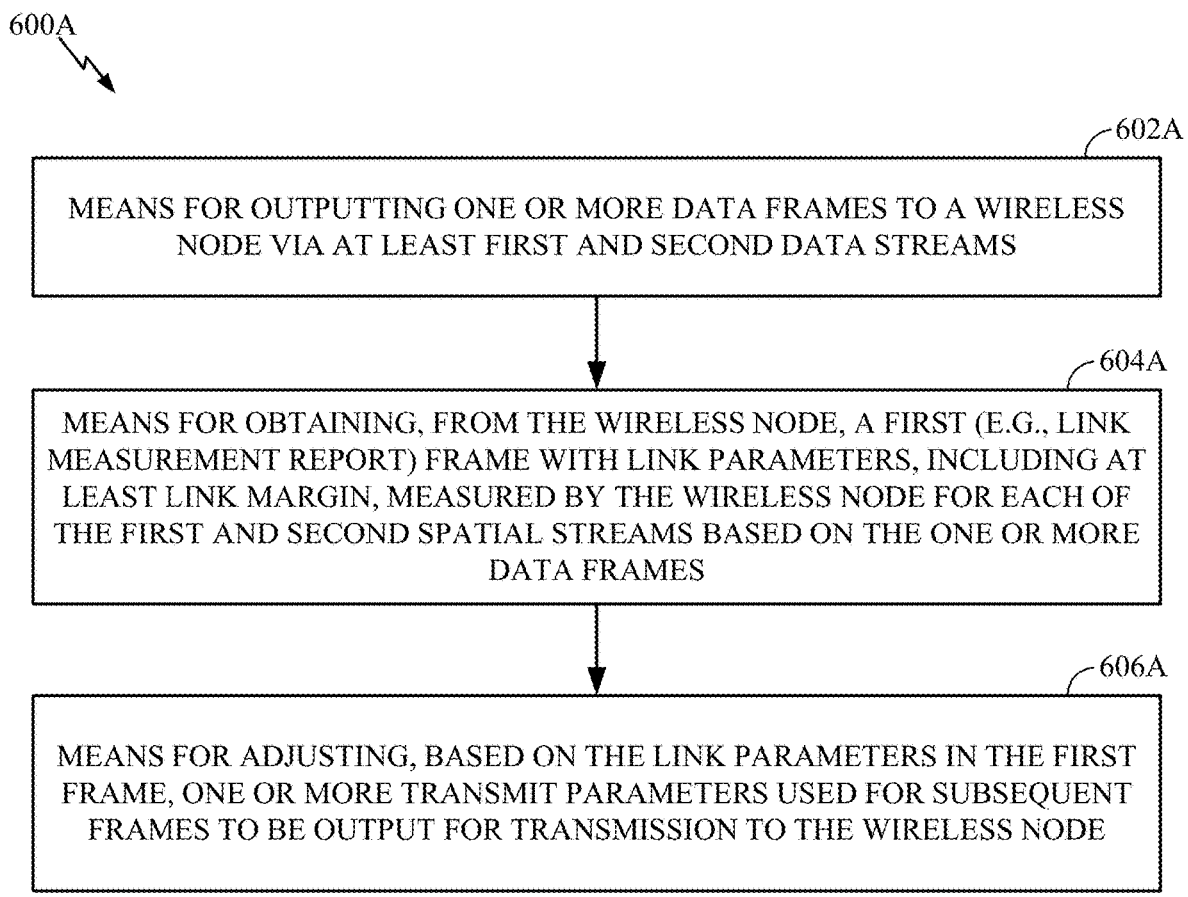
FIG. 6A illustrates example components capable of performing the operations shown in FIG. 6, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A.

Means for receiving, means for taking one or more actions, means for changing an antenna configuration, or means for obtaining may comprise a receiver (e.g., the receiver unit 222) and/or an antenna(s) 224 of the access point 110 or the receiver unit 254 and/or antenna(s) 252 of the user terminal 120 illustrated in FIG. 2. Means for transmitting, means for taking one or more actions, means for reporting, means for changing an antenna configuration, or means for outputting may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for generating, means for determining, means for logging, means for taking one or more actions, means for reporting, means for changing an antenna configuration, means for outputting, or means for obtaining may comprise a processing system, which may include one or more processors, such as the RX data processor 242, the TX data processor 210, the TX spatial processor 220, RX spatial processor 240, and/or the controller 230 of the access point 110 or the RX data processor 270, the TX data processor 288, the TX spatial processor 290, RX spatial processor 260, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a first interface configured to obtain one or more data frames from a wireless node via at least first and second spatial streams;
   a processing system configured to:
      measure a link margin for each of the first and second spatial streams based on the one or more data frames; and
      generate a first frame including the measured link margin for each of the first and second spatial streams; and
   a second interface configured to output the first frame for transmission to the wireless node.

2. The apparatus of claim 1, wherein:
   the processing system is further configured to
      measure a signal to noise ratio (SNR) for each of the first and second spatial streams based on the one or more data frames and
      select a modulation and coding scheme (MCS) to recommend for each of the first and second spatial streams; and
   the first frame also includes the measured SNR and MCS for each of the first and second spatial streams.

3. The apparatus of claim 1, wherein:
   the processing system is further configured to estimate a post-equalizer signal to noise ratio (SNR) for each of the first and second spatial streams based on the one or more data frames; and
   the first frame also includes the estimated post-equalizer SNR for each of the first and second spatial streams.

4. The apparatus of claim 1, wherein the first frame also includes an indication of the number of spatial streams for which measured link margins are provided.

5. The apparatus of claim 1, wherein:
   the first interface is further configured to obtain a control frame from the wireless node indicating a MIMO configuration; and
   the processing system is further configured to determine how many spatial streams to measure link margin for based on the MIMO configuration.

6. The apparatus of claim 1, wherein:
   the first interface is further configured to obtain a control frame from the wireless node indicating a MIMO configuration and an identification of a group to which the apparatus belongs; and
   the processing system is further configured to determine how many spatial streams to measure link margin for based on the MIMO configuration and to determine when the first frame is to be output for transmission based on an order of the apparatus in the group.

7. The apparatus of claim 6, wherein:
   the first interface is further configured to obtain a plurality of poll frames; and
   the processing system is configured to determine the first frame is to be output for transmission after obtaining one of the poll frames corresponding to the order of the apparatus in the group.

8. An apparatus for wireless communications, comprising:
   a first interface configured to output one or more data frames for transmission to a wireless node via at least first and second spatial streams;
   a second interface configured to obtain, from the wireless node, a first frame with link parameters, including at least link margin, measured by the wireless node for each of the first and second spatial streams based on the one or more data frames; and
   a processing system configured to adjust, based on the link parameters in the first frame, one or more transmit parameters used for subsequent frames to be output for transmission to the wireless node.

9. The apparatus of claim 8, wherein the link parameters also include:
   a signal to noise ratio (SNR) for each of the first and second spatial streams based on the one or more data frames; and
   a modulation and coding scheme (MCS) recommended for each of the first and second spatial streams.

10. The apparatus of claim 8, wherein the link parameters also include:
    a post-equalizer signal to noise ratio (SNR) estimated for each of the first and second spatial streams based on the one or more data frames.

11. The apparatus of claim 8, wherein the first frame also includes an indication of the number of spatial streams for which measured link margins are provided.

12. The apparatus of claim 8, wherein:
    the first interface is further configured to output for transmission a control frame indicating a MIMO configuration; and
    the first frame includes link parameters measured for a number of spatial streams determined based on the MIMO configuration.

13. The apparatus of claim 8, wherein:
    the first interface is further configured to output, for transmission,
       a control frame indicating a MIMO configuration and an identification of a group to which the wireless node belongs, and
       a plurality of poll frames for wireless nodes in the group;
    the first frame is obtained in response to the poll frame for the wireless node and includes link parameters measured for a number of spatial streams determined based on the MIMO configuration.

14. A method for wireless communications by an apparatus, comprising:

obtaining one or more data frames from a wireless node via at least first and second spatial streams;

measuring a link margin for each of the first and second spatial streams based on the one or more data frames;

generating a first frame including the measured link margin for each of the first and second spatial streams; and outputting the first frame for transmission to the wireless node.

15. The method of claim 14, further comprising:

measuring a signal to noise ratio (SNR) for each of the first and second spatial streams based on the one or more data frames; and selecting a modulation and coding scheme (MCS) to recommend for each of the first and second spatial streams;

wherein the first frame also includes the measured SNR and MCS for each of the first and second spatial streams.

16. The method of claim 14, further comprising:

estimating a post-equalizer signal to noise ratio (SNR) for each of the first and second spatial streams based on the one or more data frames;

wherein the first frame also includes the estimated post-equalizer SNR for each of the first and second spatial streams.

17. The method of claim 14, wherein the first frame also includes an indication of the number of spatial streams for which measured link margins are provided.

18. The method of claim 14, further comprising:

obtaining a control frame from the wireless node indicating a MIMO configuration; and determining how many spatial streams to measure link margin for based on the MIMO configuration.

19. The method of claim 14, further comprising:

obtaining a control frame from the wireless node indicating a MIMO configuration and an identification of a group to which the apparatus belongs; and determining how many spatial streams to measure link margin for based on the MIMO configuration and to determine when the first frame is to be output for transmission based on an order of the apparatus in the group.

20. The method of claim 19, further comprising:

obtaining a plurality of poll frames; and determining the first frame is to be output for transmission after obtaining one of the poll frames corresponding to the order of the apparatus in the group.

21. A method for wireless communications by an apparatus, comprising:

outputting one or more data frames for transmission to a wireless node via at least first and second spatial streams;

obtaining, from the wireless node, a first frame with link parameters, including at least link margin, measured by the wireless node for each of the first and second spatial streams based on the one or more data frames; and adjusting, based on the link parameters in the first frame, one or more transmit parameters used for subsequent frames to be output for transmission to the wireless node.

22. The method of claim 21, wherein the link parameters also include:

a signal to noise ratio (SNR) for each of the first and second spatial streams based on the one or more data frames; and a modulation and coding scheme (MCS) recommended for each of the first and second spatial streams.

23. The method of claim 21, wherein the link parameters also include:

a post-equalizer signal to noise ratio (SNR) estimated for each of the first and second spatial streams based on the one or more data frames.

24. The method of claim 21, wherein the first frame also includes an indication of the number of spatial streams for which measured link margins are provided.

25. The method of claim 21, further comprising:

outputting for transmission a control frame indicating a MIMO configuration;

wherein the first frame includes link parameters measured for a number of spatial streams determined based on the MIMO configuration.

26. The method of claim 21, further comprising:

outputting, for transmission, a control frame indicating a MIMO configuration and an identification of a group to which the wireless node belongs, and a plurality of poll frames for wireless nodes in the group;

wherein the first frame is obtained in response to the poll frame for the wireless node and includes link parameters measured for a number of spatial streams determined based on the MIMO configuration.

* * * * *